(12) United States Patent
Tamayo et al.

(10) Patent No.: US 12,481,350 B1
(45) Date of Patent: Nov. 25, 2025

(54) METHODS AND SYSTEMS FOR INTERACTIVE DISPLAY DEVICE

(71) Applicant: Capital One Services, LLC, McLean, VA (US)

(72) Inventors: Bryan Tamayo, Allen, TX (US); Andrew Cole Higgins, Addison, TX (US); William Merkel, Garland, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/669,995

(22) Filed: May 21, 2024

(51) Int. Cl.
G06Q 20/18 (2012.01)
G06F 3/01 (2006.01)
G06F 3/147 (2006.01)

(52) U.S. Cl.
CPC .............. *G06F 3/011* (2013.01); *G06F 3/147* (2013.01); *G06Q 20/18* (2013.01)

(58) Field of Classification Search
CPC ......... G06F 3/011; G06F 3/147; G06Q 20/18; B25J 5/007; G06N 20/00
See application file for complete search history.

(56) References Cited

U.S. PATENT DOCUMENTS

| 11,151,992 | B2 | 10/2021 | Cui et al. |
| 11,565,425 | B2 | 1/2023 | Fox et al. |
| 2016/0092034 | A1* | 3/2016 | Pillai ................ H04N 21/41415 715/733 |
| 2019/0342748 | A1* | 11/2019 | Kwatra .................. G06N 20/20 |
| 2023/0195219 | A1* | 6/2023 | Kim ........................ G06F 3/013 345/156 |
| 2024/0112532 | A1* | 4/2024 | Butler ................. G07F 17/3209 |

OTHER PUBLICATIONS

"Rent a Robot in 2024!", Advanced Robot Solutions, https://www.getrobotsolutions.com/trade-show-event-rentals, Retrieved May 21, 2024.

* cited by examiner

*Primary Examiner* — Stephen G Sherman
(74) *Attorney, Agent, or Firm* — Bookoff McAndrews, PLLC

(57) ABSTRACT

Disclosed is a system, including: a motorized base including a first surface disposed at a top of the motorized base; one or more integrated display devices; a second surface disposed proximate to the one or more integrated display devices; one or more interactive elements disposed on at least one of the first surface and the second surface; a spatial location module configured to determine a current location of the system and a destination location of the system; a user detection module configured to detect a user approaching the system; and a content personalization engine configured to determine content to be displayed on the one or more integrated display devices and the one or more output display devices.

19 Claims, 5 Drawing Sheets

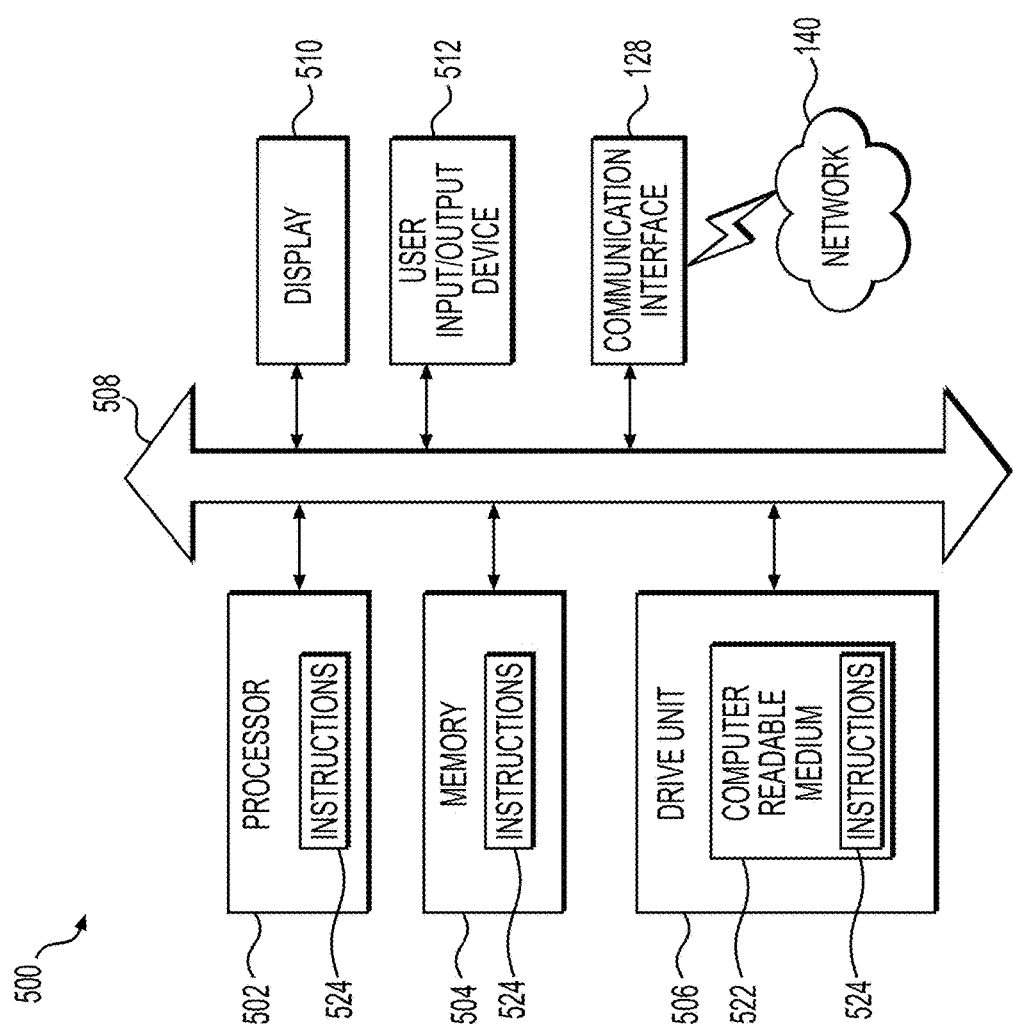

METHODS AND SYSTEMS FOR INTERACTIVE DISPLAY DEVICE

TECHNICAL FIELD

Various embodiments of this disclosure relate generally to techniques for providing interactive displays, and, more particularly, to systems and methods for providing interactive and personalized displays.

BACKGROUND

Conventional informational kiosks are limited by static interactions and lack of personalization, falling short in effectively engaging users in dynamic environments, such as trade shows, events, etc. Users may be reluctant to engage with an informational kiosk or fail to see any value in engaging with the kiosk. If a user does approach a kiosk, it may not provide information useful to the user. In some arrangements, such kiosks may be staffed by a representative of an entity associated with the kiosk, with a location of the kiosk, or with information presented by the kiosk. In such arrangements, users seeking information may be further reluctant to engage with the kiosk so as to avoid a presumed personal interaction with the representative, instead preferring fully self-serviceable interactions.

Furthermore, informational kiosks tend to be energy inefficient, and lack hardware integration and autonomy necessary for an interactive experience. The informational kiosks typically have to be manually operated and administered, such that informational content and interactive displays are not dynamic and cannot be tailored to individual users. Additionally, informational kiosks tend to be statically arranged within a space and do not communicate information to and from other informational kiosks in the space.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for providing interactive displays, and, more particularly, to systems and methods for providing interactive and personalized displays.

In some aspects, the techniques described herein relate to a system, including: a motorized base including a first surface disposed at a top of the motorized base; one or more integrated display devices; a second surface disposed proximate to the one or more integrated display devices; one or more interactive elements disposed on at least one of the first surface and the second surface; a spatial location module configured to determine a current location of the system and a destination location of the system; a user detection module configured to detect a user approaching the system; and a content personalization engine configured to determine content to be displayed on the one or more integrated display devices and the one or more output display devices.

In some aspects, the techniques described herein relate to a method for facilitating user interaction with a kiosk, the method including: receiving, from a kiosk, first spatial data including a location of the kiosk; receiving, from one or more short-range wireless devices, second spatial data including the location of the kiosk and a location of one or more users; determining, using a first machine learning system, an optimal location of the kiosk based on the location of the kiosk and the location of the one or more users; detecting, using a second machine learning system, whether at least one user among the one or more users is within a pre-determined distance of the kiosk; and upon determining that at least one user is within a pre-determined distance of the kiosk, initiating an interaction between the kiosk and the at least one user.

In some aspects, the techniques described herein relate to a method for facilitating user interaction with a kiosk, the method including: receiving, from sensors positioned on a kiosk, first spatial data including a location of the kiosk; receiving, from one or more short-range wireless devices, second spatial data including the location of the kiosk and a location of one or more users; determining an optimal location of the kiosk based on the location of the kiosk and the location of the one or more users; detecting whether at least one user among the one or more users is within a pre-determined distance of the kiosk; and upon determining that at least one user is within a pre-determined distance of the kiosk, initiating an interaction between the kiosk and the at least one user.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary aspects and together with the description, serve to explain the principles of the disclosed aspects.

FIG. 5 is a functional block diagram of a computer, according to exemplary embodiments of the present disclosure.

DETAILED DESCRIPTION

Figure 1:
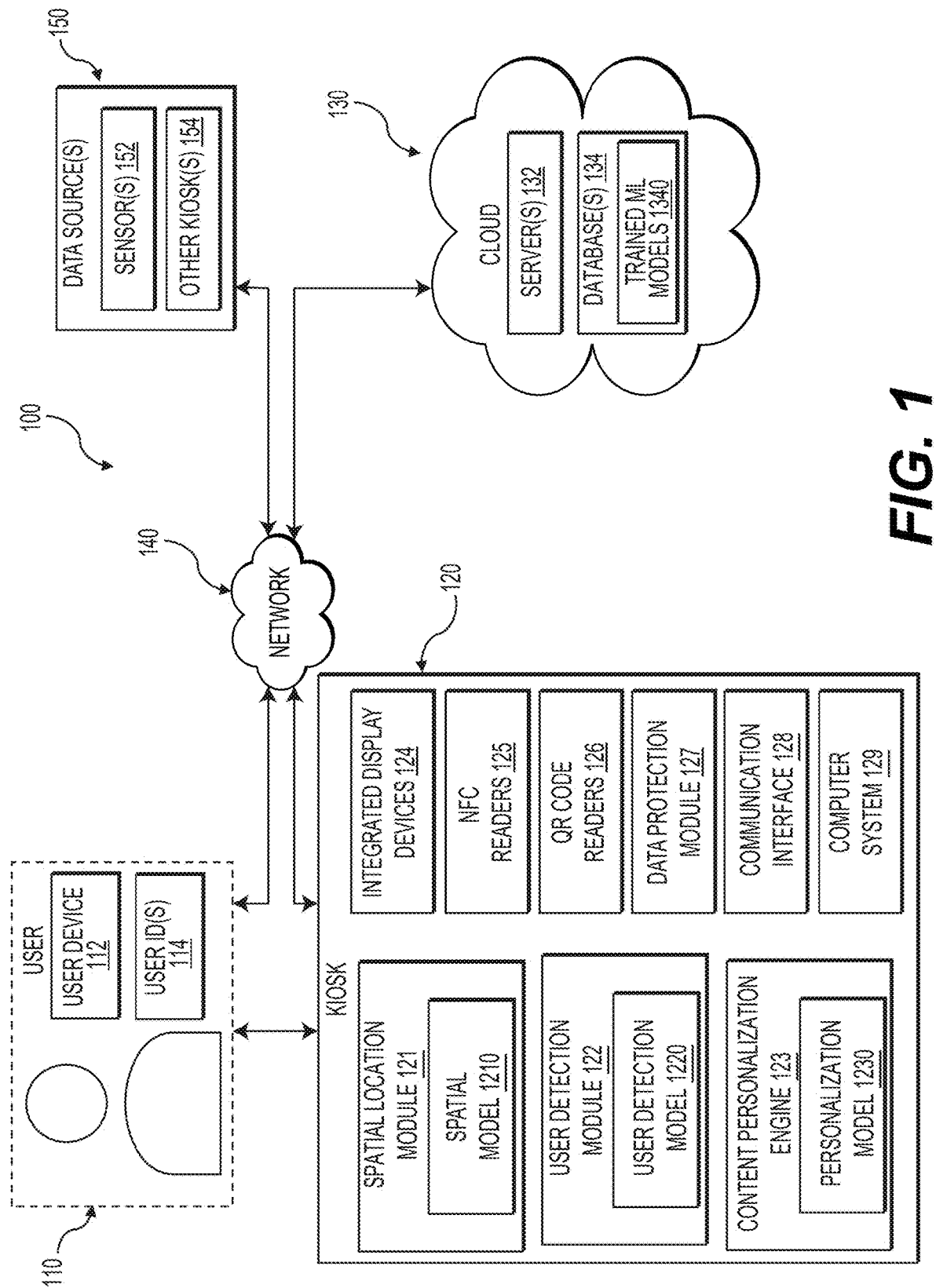
FIG. 1 depicts an exemplary environment for providing an interactive display device, according to certain aspects.

According to certain aspects of the disclosure, methods and systems are disclosed for providing an interactive display device (e.g., a computing device such as a kiosk, terminal, ATM, etc.). As will be discussed in more detail below, in various embodiments, systems and methods are described for providing a kiosk (e.g., a smart kiosk) including interactive displays and personalized content to one or more users.

As briefly discussed above, conventional informational kiosks are limited by static interactions and lack of personalization, falling short in effectively engaging users in dynamic environments, such as trade shows, events, etc. Users may be reluctant to engage with an informational kiosk or fail to see any value in engaging with the kiosk. If a user does approach a kiosk, it may not provide information useful to the user. Furthermore, informational kiosks tend to be energy inefficient, and lack hardware integration and autonomy necessary for an interactive experience. The informational kiosks typically have to be manually operated and administered, such that informational content and interactive displays are not dynamic and cannot be tailored to individual users. Additionally, informational kiosks tend to be statically arranged within a space and do not communicate information to and from other informational kiosks in the space.

To address these challenges, systems and methods are described herein for providing an interactive display device, including machine learning based determinations for providing an interactive display device. As described in detail throughout the disclosure, one or more machine learning models may be trained and used to determine process steps in providing an interactive display device to one or more users.

In an exemplary use case, a kiosk, such as a smart (e.g., a wired or wireless context-aware electronic device that is configured to connect, share, and interact with its user or other user devices) kiosk may be provided with, among other elements, a spatial location module, a user detection module, and a content personalization engine for providing interactive content to a user.

The spatial location module may be configured to determine the current location of the kiosk based on data received from one or more on-board or remote sensors, and configured to determine a destination location of the kiosk based on an output of the spatial location module. The spatial location module may be configured to determine the current location of the kiosk based on first data received from first one or more on-board or remote sensors. The one or more on-board or remote sensors may include, by way of example only, camera sensors, proximity sensors, gas sensors, microphones, global positioning system (GPS) receivers, or the like.

The first data received from the first one or more on-board or remote sensors may be provided to a first trained machine learning model of the spatial location module trained to output one or more of a current location of the kiosk, a current location of one or more other kiosks, current locations of one or more users within a space, or predicted locations of the one or more other kiosks and one or more users. As described in further detail herein, the kiosk may include a motorized base such that it may be navigated to a location determined by the spatial location module.

The user detection module may include a second trained machine learning model configured to determine when one or more users are approaching the kiosk. Inputs to the user detection module may include second data received from second one or more on-board or remote sensors. In some arrangements, the second sensors may be the same as or similar in type to the first sensors. The user detection module may also receive inputs from short-range wireless sensors, such as Bluetooth™ low energy sensors or the like, that provide information regarding the approach and proximity of user devices that receive and emit short-range wireless signals, for example, utilizing 2.4 Gigahertz (GHz) radio frequencies (e.g., a Bluetooth™ signal or a Bluetooth LE™ signal), such as smartphones, tablets, and other personal devices.

The content personalization engine may be configured to determine user-specific content to be displayed on one or more display devices of the kiosk based on inputs from the user detection module, from third one or more sensors, such as camera sensors, proximity sensors, gas sensors, microphones, global positioning system (GPS) receivers, or the like cameras, microphones, and from one or more users. In some arrangements, the third sensors may be the same as or similar in type to the first sensors and the second sensors. Both the user detection module and the content personalization engine may include elements configured to identify a user or to provide a user a prompt inviting the user to provide identification data. This may include transmitting a signal to a user device of the user that causes the user device to display the prompt, or displaying the prompt on an integrated display on the smart kiosk, the integrated display including a feedback component to receive feedback from the user. For example, the integrated display may be a computer console including input/output devices such as a microphone, camera, mouse, and keyboard, or a touchscreen display that may further include any further input/output devices. The content personalization engine includes a third trained machine learning model that receives as inputs, for example, information related to the one or more users received from the third one or more sensors or the user detection module and one or more inputs by the one or more users. In turn, the content machine learning model is configured to output content to be displayed to the one or more users.

The kiosk further includes one or more interactive elements such as, for example, a near field communication (NFC) reader, a radio frequency identification (RFID) reader, or an optical marker reader (e.g., a quick-response (QR) code reader, or static optical marker that may be read by a user device). User interaction with these interactive elements may also provide user data to the kiosk and to the content personalization engine to tune the output of user-specific content.

In another example, kiosks 120 may be deployed without interactive displays or with displays disabled in environments with limited or no internet connectivity, or where installing integrated displays is not feasible. In this example, the kiosks 120 may still facilitate user interaction through NFC taps or QR code scans. This allows for interactive content to be delivered to a user device 112 without the requirement for internet access, ensuring that information and services remain accessible. Deploying kiosks without enabled displays also allows for a cost-effective deployment in situations requiring a more economical setup without the need for integrated displays, allowing for widespread accessibility. Furthermore, encouraging users to use their own devices may enhance personal comfort and familiarity, potentially increasing engagement with the kiosks 120.

In this example, the kiosks 120 act as points of initiation for content delivery, with the actual interaction taking place on the user's mobile device. This method relies on pre-loaded content or applications that can operate independently of real-time internet connectivity, ensuring that users have access to valuable information and services despite environmental limitations.

These and other aspects of the techniques and technologies of this disclosure will be discussed in greater detail throughout the present disclosure. While specific examples included throughout the present disclosure involve kiosks in retail or banking environments and event spaces, it should be understood that techniques according to this disclosure may be adapted to similar structural components or methods for other use cases. It should also be understood that the examples above are illustrative only. The techniques and technologies of this disclosure may be adapted to any suitable activity.

Accordingly, reference to any particular activity is provided in this disclosure only for convenience and is not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" may convey "based at least in part on." The singular forms "a," "an," and "the" may include plural referents unless the context dictates otherwise. The term "exemplary" may be used in the sense of "example" rather than "ideal." The terms "comprises," "comprising," "includes," "including," or other variations thereof, may convey a non-exclusive inclusion such that a process, method, or product that comprises a list of elements does not necessarily include only those elements, but may include other elements not expressly listed or inherent to such a process, method, article, or apparatus. The term "or" may be interpreted disjunctively, such that "at least one of A or B" includes, (A), (B), (A and A), (A and B), etc. Similarly, the term "or" is intended to mean "and/or," unless explicitly stated otherwise. "And/or" may convey all permutations, combinations, subcombinations, and individual instances of items or terms included within a list of the items or terms. Relative terms, such as, "substantially," "approximately," "about," and "generally," are used to indicate a possible variation of ±10% of a stated or understood value.

It will also be understood that, although the terms first, second, third, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Terms like "provider," "services provider," or the like may generally encompass an entity or person involved in providing, selling, or renting items to persons, as well as an agent or intermediary of such an entity or person. An "item" may generally encompass a good, service, or the like having ownership or other rights that may be transferred. As used herein, terms like "user" generally encompass any person or entity that may interact with a kiosk or similar system. The term "application" may be used interchangeably with other terms like "program," or the like, and generally encompasses software that is configured to interact with, modify, override, supplement, or operate in conjunction with other software.

The term "machine learning model" may generally encompass instructions, data, or a model configured to receive input, and apply one or more of a weight, bias, classification, or analysis on the input to generate an output. The output may include, e.g., a classification of the input, an analysis based on the input, a design, process, prediction, or recommendation associated with the input, or any other suitable type of output. A machine learning model is generally trained using training data, e.g., experiential data or samples of input data, which are fed into the model in order to establish, tune, or modify one or more aspects of the model, e.g., the weights, biases, criteria for forming classifications or clusters, or the like. The training data may be generated, received, or otherwise obtained from internal or external resources. Aspects of a machine learning system may operate on an input linearly, in parallel, via a network (e.g., a neural network), or via any suitable configuration. By virtue of such training, a machine learning model is converted from an un-trained and un-specific model to a model that is unique to and specifically configured for the particular purpose for which it is trained. In an example, training of a machine learning model is analogous to a method of production in which the article produced is the trained model having unique characteristics by virtue of its particular training. Moreover, the result of training a machine learning model using particular training data and for a particular purpose results in a technical solution to an inherently technical problem.

The execution of the machine learning model may include deployment of one or more machine learning techniques, such as linear regression, logistical regression, random forest, gradient boosted machine (GBM), deep learning, or a deep neural network. Supervised or unsupervised training may be employed. For example, supervised learning may include providing training data and labels corresponding to the training data, e.g., as ground truth. Unsupervised approaches may include clustering, classification, or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc. Alternatively, reinforcement learning may be employed for training. For example, reinforcement learning may include training an agent interacting with an environment to make a decision based on the current state of the environment, receive feedback (e.g., a positive or negative reward based on accuracy of decision), adjusts its decision to maximize the reward, and repeat again until a loss function is optimized.

Presented below are various aspects of machine learning techniques that may be adapted for one or more of the spatial location module, the user detection module, and the content personalization engine. As will be discussed in more detail below, the machine learning techniques may include one or more aspects according to this disclosure, e.g., a particular selection of training data, a particular training process for the machine learning models, operation of the machine learning models in conjunction with particular data, modification of such particular data by the machine learning models, etc., or other aspects that may be apparent to one of ordinary skill in the art based on this disclosure.

FIG. 1 depicts an exemplary environment for providing an interactive display for user interaction, according to one or more embodiments.

One or more components of the environment 100 may communicate with one or more of the other components of the environment 100 across electronic network 140, including one or more components associated with a user 110, one or more systems and elements associated with a kiosk 120, one or more systems and elements within a cloud 130, where cloud 130 may be any local or networked system suitable for transferring data, and one or more remote data source(s) 150 external to the kiosk 120. A central server stored in cloud 130 may be used to manage and synchronize content across all kiosks, ensuring consistent and up-to-date information is displayed. The central server may include a central content management system, using a high-level web framework to manage data stored in a database 134, with content delivery optimized through a content delivery network.

The environment 100 of FIG. 1 depicts one user 110 associated with a single (e.g., only one) user device 112 and having a single (e.g., only one) user ID 114. However, in other examples, there may be a plurality of users 110 each with components (e.g., user devices 112 or user IDs 114) communicating with one or more kiosks 120 and other components via network 140, or a user 110 may be associated with a plurality of components (e.g., a plurality of user devices 112 or user identification IDs 114 associated with or otherwise registered to the same user 110). Additionally, while a single (e.g., only one) kiosk 120 is depicted in FIG. 1, it is understood that environment 100 may include a plurality of kiosks 120 (e.g., a network of kiosks) without departing from the scope of this disclosure.

Components associated with user 110 may include one or more user devices 112 or one or more user identification devices and elements, collectively referred to as user IDs 114. User device 112 may be configured to enable the user to access or interact with other systems in environment 100. For example, user device 112 may be a computer system such as, for example, a desktop computer, a laptop computer, a tablet, a smart cellular phone, a smart watch or other electronic wearable, etc. In some embodiments, user device 112 may include one or more electronic applications, e.g., a program, plugin, browser extension, etc., installed on a memory of the user device 112. In some embodiments, the electronic applications may be associated with one or more of the other components in environment 100. For example, an application associated with a provider may be executed on the user device 112 that enables interaction with kiosk 120, where the kiosk 120 may also be associated with the same provider. For example, a provider may be a retailer or an organization organizing an event (e.g., a conference, trade show, exhibition or the like) or may be a host of an event (e.g., a hotel, conference center, etc.). Kiosk 120 may be provided by the provider such that data and executable instructions associated with the provider may be incorporated into a memory within computer system 129 of kiosk 120. This may be data and executable instructions associated with generating and displaying interactive graphical displays on one or more integrated display devices 124 of kiosk 120. The interactive graphical displays may be content related to the provider, and may include personalized content for user 110 (e.g., tailored content specific to a certain user 110 as opposed to any other user 110), as described in further detail below. The integrated display devices 124 may be, for example, tablets, touchscreen monitors with built-in computing elements, etc.

In some examples, the applications may be thick client applications installed locally on user device 112 or thin client applications (e.g., web applications) that are rendered via a web browser launched on the user device 112.

Additionally, one or more components of user device 112 may generate, or may cause to be generated, one or more graphic user interfaces (GUIs) based on instructions/information stored in the memory of user device 112, instructions/information received from the other systems in environment 100 (e.g., kiosk 120), or the like and may cause the GUIs to be displayed via a display of user device 112. The GUIs may be, e.g., application interfaces or browser user interfaces and may include text, input text boxes, selection controls, or the like. The display may include a touch screen or a display with other input systems (e.g., a mouse, keyboard, etc.) for the user to control the functions of user device 112.

User IDs 114 may include, for example, near field communication (NFC) tags, radio frequency identification (RFID) tags, or optical images, such as quick-response (QR) codes. In some arrangements, user IDs 114 may be provided by the provider and be associated with user 110 and an event provided by the provider. For example, the tags or codes may be included with a badge provided for an event, such as, for example, a trade show or networking event. In other arrangements, user IDs 114 may be provided by another entity other than the provider, yet be associated with the user (e.g., upon registration or other action) with the provider for an event. The user IDs 114 may further include transaction cards, such as debit or credit cards, hotel keys, membership cards, or the like, and may also be integrated into the user device 112. The user IDs 114 may further be used to purchase items, whether by association with a financial institution or the like, in the case of credit or debit cards, etc., or by charging to an entity associated with the membership card, such as by charging an item to a hotel room where the user ID is a hotel key.

Kiosk 120 may include one or more interactive elements, such as an NFC reader 125, a QR code reader 126, or other such readers such as an RFID reader, for receiving data from the user IDs 114 and transmitting that data to other elements within kiosk 120 or environment 100, as described in more detail below. Additionally, while user device 112 and user ID 114 are depicted as separate instruments, it is understood that in some arrangements, user device 112 may also include the functionality of user ID 114. The user device 112 may include, for example, a "wallet" including virtual transaction cards, such as debit or credit cards, hotel keys, membership cards, or the like.

Kiosk 120 may be a smart mobile device configured to move about a space and provide interactive content via integrated display devices 124 to one or more users 110. For example, kiosk 120 may include a spatial location module 121, a user detection module 122, and a content personalization engine 123, among other components. Spatial location module 121, user detection module 122, and content personalization engine 123 may be stored within computer system 129 of kiosk 120 or may be separate modules of kiosk 120. In some examples, spatial location module 121, user detection module 122, and content personalization engine 123 may include one or more elements remote from kiosk 120 and made available (e.g., via network 140) to kiosk 120.

Each kiosk 120 may also be equipped with ambient light sensors to detect the lighting conditions of its surroundings. Kiosk 120 may automatically adjust the illumination level of the integrated display devices 124 in response to the ambient light conditions to ensure that all displays and interfaces remain visible and engaging in all lighting conditions, such as dark corners of a space. The ambient light sensors may be connected to a control system within kiosk 120, such as computer system 129. Kiosk 120 may also include accent lighting which may be adjusted as needed to maintain a predetermined optimal visibility.

A central audio system may be included with kiosk 120 to enable kiosk 120 to deliver audible messages, alerts, or interactive audio content, catering to use cases where visual communication alone may not suffice. The central audio system may be implemented by incorporating, for example, an omni-directional speaker system controlled through a software interface, allowing for dynamic content delivery, including text-to-speech for accessibility. User detection (e.g., via user detection module 122) near the kiosk 120 may be used to trigger the playing of music and or message audio to indicate the recognition of potential users.

Integrated microphones, such as those incorporated into spatial location module and user detection module 122, positioned around kiosk 120 may be used to capture audio input from users, supporting voice commands or interactive applications requiring verbal communication. Such an integrated microphone array may be incorporated into integrated display devices 124. Alternatively or additionally, a set of isolated microphones, for example, four isolated microphones positioned one on each corner of kiosk 120, may be connected to a digital signal processor (DSP) that filters and interprets voice commands, ensuring clear and focused audio capture even in noisy environments. It is understood that in other arrangements less or more than four microphones may be utilized without departing from the scope of this disclosure. Data protection module 127 may be provided to ensure the security of user data and to protect the kiosk 120 from unauthorized access or tampering. Data protection module 127 may use Secure Sockets Layer/Transport Layer Security (SSL/TLS) for secure data transmission, with user data encrypted using Advanced Encryption Standard (AES)-256 encryption standards, managed by a security module on the kiosk for hardware-level protection. A power management system manages the kiosk's power usage, including a low-power mode for energy conservation when not actively engaged with a user. The power management system may be implemented via an intelligent power management circuit designed with power management integrated circuits, controlled by firmware on a microcontroller to optimize battery life and charge cycles.

In some instances, the kiosk 120 may detect more than one user approaching the kiosk 120. In these instances, a user interaction may be initiated for a separate user on each of separate integrated display devices 124 in an individual capacity. In other words, each user may have a separate and independent interaction with the kiosk via separate displays.

In other instances, a multi-user interaction mode may be implemented that enables multiple people to interact with the kiosk simultaneously and interdependently, whether for collaborative purposes, such as joint information exploration, or competitive scenarios, such as games or challenges.

Multi-user interaction mode may be implemented, for example, by including a prompt on one of integrated display devices 124 asking the user(s) to confirm their intent to initiate a multi-user interaction mode. In some implementations, multi-user interaction mode will only be implemented on the integrated display devices 124 of users that agree to enter the multi-user interaction mode.

Kiosk 120 may include a software framework that supports multi-touch input on one or more of displays 124 and can recognize and differentiate inputs from multiple users. Additionally, the system architecture may allow for the segregation and processing of concurrent audio inputs, facilitating a collaborative or competitive multi-user experience.

Spatial location module 121 may be configured to determine a current location of kiosk 120 and a destination location of kiosk 120. Spatial location module 121 may include onboard sensor components, such as a GPS receiver, a camera sensor, and one or more proximity sensors. Spatial location module 121 may also be configured to receive signals from other data sources 150, such as external sensors 152 and other kiosks, generally designated as 154. The other kiosks 154 may include the same sensor arrays as kiosk 120, such as GPS receivers, camera sensors, or proximity sensors. GPS receivers may be configured to receive geolocation and time information from GPS signals transmitted by satellite-based global navigation radio transmitters. Camera sensors may be configured to capture image data related to the location of local obstacles and topography. Proximity sensors may be configured to emit an electromagnetic field or a beam of electromagnetic radiation and measure changes in the field or return signal to determine a distance to targets within the field of measurement.

Spatial location module 121 may further include a trained machine learning model 1210, e.g., a trained location machine learning model. Trained location machine learning model 1210 may be stored locally in a memory of spatial location module 121 or computer system 129, or may be stored in a trained model store 1340 in database 134 of servers 132 on cloud 130 and accessed via network 140. Trained location machine learning model 1210 may be trained on inputs such as locations of kiosks and users, and ground truth data relating to optimal kiosk positioning based on locations of other kiosks and users. For example, the model may direct the kiosks to navigate to locations in which users may be congregating to ensure interaction, or the model may direct the kiosks to navigate to locations in which there are less than expected numbers of users, such that the kiosk may attract users to those locations within the space. Trained location machine learning model 1210 outputs an optimal location, which may be provided to spatial location module 121 and used to control a motor (such as motor 211 described with respect to FIGS. 2B) to navigate kiosk 120 to a destination location, the destination location being the optimal location output by the trained location machine learning model 1210.

Spatial location module 121 may apply data analysis to make determinations as to the spacing of kiosks 120, and may provide this data to trained location machine learning model 1210 for future uses of the kiosks 120. For example, spatial location module 121 may determine the number of people in a given vicinity of the kiosk 120, and the number of people within that vicinity that choose to interact with the kiosk and for how long. This determination may aid in determining an optimal number of kiosks and the value of the display devices in capturing users' attention and engaging with users in a given context.

User detection module 122 may be configured to detect a user or one or more users approaching kiosk 120. User detection module 122 may include sensor components, such as cameras, motion detectors and proximity sensors to track users as they approach kiosk 120 as described with respect to spatial location module 121, and may also include, for example, gas sensors to measure relative humidity, pressure, temperature, and changes in gas composition proximate to kiosk 120 that may be consistent with users approaching. User detection module 122 may further include gaze tracking to determine that a user is approaching and that a user's gaze is on kiosk 120. Gaze tracking may be achieved using the cameras and a trained user detection machine learning model 1220 that has been trained to identify a gaze upon a camera. User detection module 122 may be configured to activate interfaces on kiosk 120 to prepare for interaction with users. NFC readers 125, QR code readers 126 and other interactive elements may also be operably connected to user detection module 122 to detect that a user has approached the kiosk and activate the interfaces and displays, if not already activated.

User detection module 122 may further include receivers configured to receive signals from user devices 112 or other kiosks 120 indicating that a user intends to interact with the kiosk 120. For example, a user 110 may initiate an interaction with a kiosk 120 via a mobile application loaded on a user device 112, or a kiosk 120 that a user had previously interacted with may direct a user to go to a next kiosk 120, and send a signal to the next kiosk that the user will be approaching. For example, kiosks 120 may include materials to be distributed to users, such as, promotional items like clothing, books, pamphlets, giveaways, or food items. If one kiosk 120 is out of the promotional items, it may notify a user of another kiosk 120 that still has inventory, and may direct the user to that next kiosk 120. In these instances, a kiosk 120 may alert the next kiosk 120 that a user will be approaching the next kiosk 120.

User detection module 122 may further include a trained user detection machine learning model 1220. Trained user detection machine learning model 1220 may be stored locally in a memory of user detection module 122 or computer system 129, or may be stored in a trained model store 1340 in cloud 130 and accessed via network 140. User detection machine learning model 1220 may be trained on input data from, for example, cameras, motion detectors, proximity sensors, or gas sensors such as those described above, and ground truths relating to the data retrieved from sensors and the proximity, distance, or number of users associated with the data. Trained user detection machine learning model 1220 may be used to determine how many users approach kiosk 120 at any given time, and may be used to activate interfaces to accommodate multiple users where it is determined that multiple users are approaching kiosk 120. Trained user detection machine learning model 1220 may also be tuned to determine when in the approach of one or more users to optimally activate integrated display devices 124.

Content personalization engine 123 may be configured to determine content to be displayed on the one or more integrated display devices 124. The content to be displayed may be informational, may include interactive links and activities, and may include purchasing options for the user, in some examples. Content personalization engine 123 may receive information related to one or more users from, for example, NFC readers 125, QR code readers 126, or other sources, such as RFID readers. Users 110 may provide their user IDs 114 via interactive elements, such as tapping a badge with an NFC tag against NFC reader 125. In some examples, a QR code scanner may integrate a camera-based QR code scanning system using a computer system 129 to decodes a scannable QR code to direct the user, via user device 112, to a mobile browser to relevant content hosted on the kiosk's local server when the user device 112 or smart badge user ID 114 has a scannable QR code.

After the content personalization engine 123 has determined the identity of the user, it may have further access to more user information based on a user profile maintained, for example, by the provider of the kiosk 120. In some examples, the provider of the kiosk 120 may be a financial institution, and the user ID 114 may be a transaction card associated with the financial institution or the user device 112 may include a mobile application of the financial institution, and the mobile application may communicate to the kiosk the identity of the user 110. Upon authenticating the user, the kiosk 120 may then have access to the user's transaction and financial information, e.g., financial information, income information, transaction history, credit rating data, demographic data, purchasing behavior, purchasing history, etc. The user's transaction and financial information may be used as an input to the content personalization engine to determine content that would be useful or engaging to the particular user.

Content personalization engine 123 may further use cameras to perform an emotive detection process to gauge whether a user is satisfied with an interaction. For example, content personalization engine 123 may be configured to control camera(s) for purposes of detecting user emotions, including the turning on and off of cameras for such purposes. Content personalization engine 123 may include an emotion analyzer configured to analyze the image data to determine an emotional response assessment. The emotion analyzer may be an application or software component configured to perform facial expression recognition (FER) on the image data to determine the emotional response assessment. Emotional response assessment may include values of one or more emotion parameters. An emotion parameter may be, for example, a parameter representing the degree to which a person exhibits a certain emotion or emotional characteristic. Examples of emotions include happiness, surprise, anger, disgust, fear, sadness, satisfaction, and dissatisfaction. An emotion parameter may have a range or set of possible values. Additionally, if an emotion (e.g., happiness) represented by an emotion parameter has an opposite emotion (e.g., sadness), the emotion parameter may also represent that opposite emotion. For example, an emotion parameter may be a happy/sad parameter having a range of values from 0 to 1, with 1 corresponding to an assessment of "very happy" and 0 corresponding to an assessment of "very sad." It is noted that this range of 0 to 1 is exemplary, and that other ranges or sets of values may be used. For example, it is also possible to use a negative value to represent "sad," a positive value to represent "happy," and a value of 0 to represent "neutral." It is also possible for the range to be from 1 to 5, where 1 represents "very sad," 2 represents "somewhat dissatisfied," 3 represents "neutral," 4 represents "somewhat happy," and "5 represents very happy." In the above examples, "sad" and/or "happy" may be replaced with "dissatisfied" and/or "satisfied," respectively. That is, the happy/sad parameter described above may instead be a dissatisfied/satisfied parameter.

Kiosk 120 may include one or more output devices, such as a display and/or audio speakers, to present content to a user 110. Kiosk 120 may further include one or more of the aforementioned sensors and input devices, such as a camera or microphone, to detect a characteristic of image data of the user 110 during usage of and interaction with kiosk 120 and its content. The camera and microphone may be used to record image and/or video data of the user 110, and a microphone configured to record audio data of the user 110.

The camera may record the image portion of video data. Data recorded by the sensors, such as the image and/or video data, may serve as the basis for user feedback data that is generated by kiosk 120 and transmitted to servers 132 on the cloud 130 over network 140. The servers 132 may then utilize this information to determine the reaction of user 110 to content on the kiosk to further train a content personalization model 1230.

Content personalization engine 123 may further include the trained content machine learning model 1230. Trained content machine learning model 1230 may be stored locally in a memory of content personalization engine 123 or computer system 129, or may be stored in a trained model store 1340 in cloud 130 and accessed via network 140. Cloud 130 may be a cloud computing system including, for example, a single server or a plurality of servers. The servers in cloud may be located remote from the other components of environment 100. Trained content machine learning model 1230, e.g., third machine learning model, may be trained to determine user-specific content to be displayed on one or more display devices of the kiosk based on training inputs from the user detection module, from third one or more sensors, such as camera sensors, proximity sensors, gas sensors, microphones, global positioning system (GPS) receivers, or the like cameras, microphones, and from one or more users. In some arrangements, the third sensors may be the same as or similar in type to the first sensors and the second sensors. Trained content machine learning model 1230 may further be trained to determine to provide a user a prompt inviting the user to provide identification data. This may include receiving training data from a user device of the user that causes the user device to display the prompt, or displaying the prompt on an integrated display on the smart kiosk, the integrated display including a feedback component to receive feedback from the user. For example, the integrated display may be a computer console including input/output devices such as a microphone, camera, mouse, and keyboard, or a touchscreen display that may further include any further input/output devices.

Network 140 over which the one or more components of environment 100 communicate may include one or more wired or wireless networks, such as a wide area network ("WAN"), a local area network ("LAN"), personal area network ("PAN"), a cellular network (e.g., a 3G network, a 4G network, a 5G network, etc.) or the like. In some embodiments, network 140 includes the Internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. Components of environment 100 may be connected via network 140, using one or more standard communication protocols. Components of environment 100 may transmit and receive communications from each other across network 140, as discussed in more detail below.

The data sources 150 external to kiosk 120 may include sensors 152 such as a plurality of short-range wireless transmitters, such as Bluetooth® low energy sensors and transmitters, cameras to gauge the location of obstacles or volume of people, GPS transmitters and receivers, microphones, gas sensors, or the like. The short-range wireless transmitters and sensors may be used for precise indoor positioning and for sending proximity-based notifications to user devices 112. The notifications may be interfaced with the kiosk's system through, for example, MQTT protocol for real-time communication, or any other machine to machine network protocol suitable for message queue/message queuing service.

Although depicted as separate components in FIG. 1, it should be understood that a component or portion of a component in the system of exemplary environment 100 may, in some embodiments, be integrated with or incorporated into one or more other components. In some embodiments, operations or aspects of one or more of the components discussed above may be distributed amongst one or more other components. Any suitable arrangement or integration of the various systems and devices of the exemplary environment 100 may be used. One or more of the components of the exemplary environment 100 may be associated with a common entity. For example, an application associated with a provider may be executed on the user device 112 that enables interaction with kiosk 120, where the kiosk 120 may also be associated with the same provider. For example, a provider may be a retailer or an organization organizing an event (e.g., a conference, trade show, exhibition or the like) or may be a host of an event (e.g., a hotel, conference center, etc.). Kiosk 120 may be provided by the provider such that data and executable instructions associated with the provider may be incorporated into a memory within computer system 129 of kiosk 120. This may be data and executable instructions associated with generating and displaying interactive graphical displays on one or more integrated display devices 124 of kiosk 120. The interactive graphical displays may be content related to the provider, and may include personalized content for user 110 (e.g., tailored content specific to a certain user 110 as opposed to any other user 110), as described in further detail below.

In the following disclosure, various acts may be described as performed or executed by a component from FIG. 1. However, it should be understood that in various embodiments, various components of exemplary environment 100 discussed above may execute instructions or perform acts including the acts discussed below. An act performed by a device may be considered to be performed by a processor, actuator, or the like associated with that device. Further, it should be understood that in various embodiments, various steps may be added, omitted, or rearranged in any suitable manner.

Figure 2B:
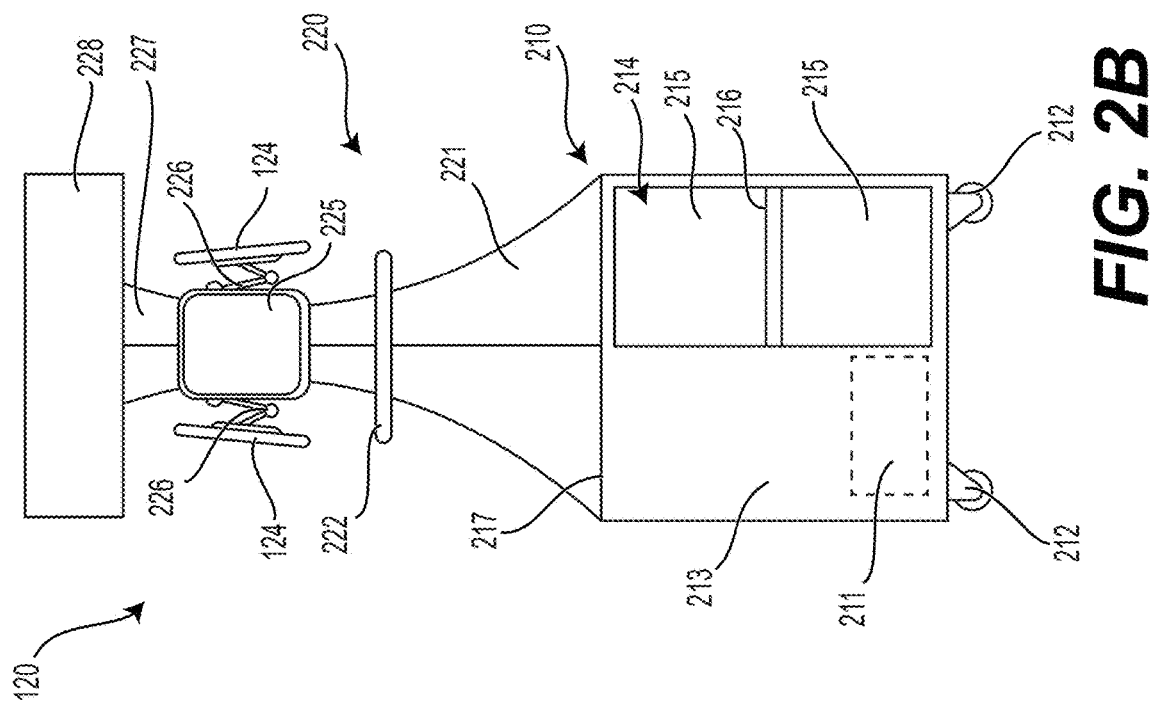
FIG. 2B depicts a side view of an interactive display device, according to some embodiments of the disclosure.
Figure 2A:
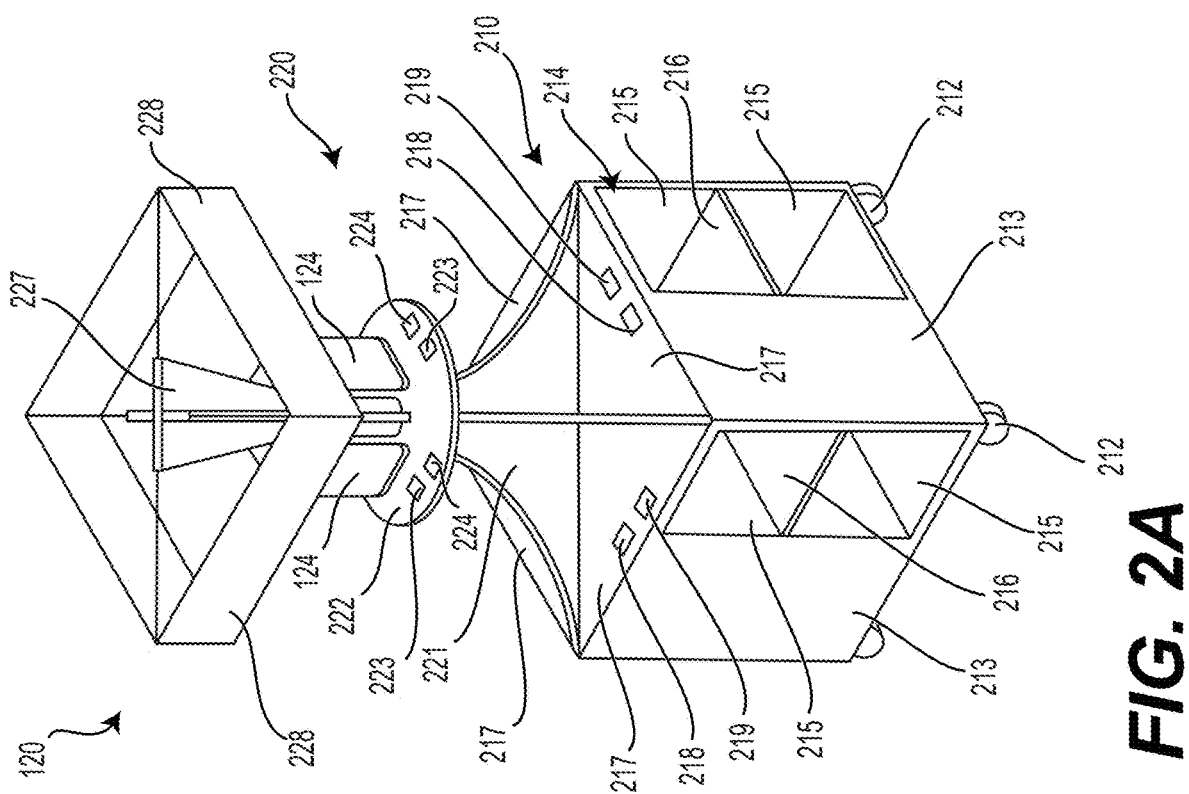
FIG. 2A depicts a perspective view of an interactive display device, according to some embodiments of the disclosure.

FIGS. 2A and 2B illustrate an exemplary interactive display device, or kiosk 120, including to some embodiments. Kiosk 120 may include a motorized base 210, including a motor 211 operably connected to casters or wheels 212. While wheels 212 are shown and described herein, the disclosure is not so limited. Rather, any device for supporting and moving motorized base 210 may be utilized. Motor 211 may receive commands, instructions, or signals from spatial location module 121 described above. Motorized base 210 may have a generally rectangular or square cross-section and comprise four sides. Each of the four sides may be provided a display portion 213 and a storage portion 214. Display portion 213 may include a static display or a programmable, interactive display. Content to be displayed on display portion 213 may be provided based on one or more of user detection module 122 or content personalization engine 123.

Storage portion 214 may include, for example, a plurality of compartments 215 separated by shelves 216. While a single shelf and two compartments 215 are detailed for each side of kiosk 120, it is understood that a greater number of compartments or shelves may be utilized without departing from the scope of this disclosure. The storage portion 214 may include items that are tagged with scannable codes. These items may be, for example, promotional items such as clothing, books, pamphlets, giveaways, or food items. A user 110 may scan the code on the item to purchase an item if the item is for sale, and the kiosk 120 may provide content to complete the transaction (operating as a point of sale device). If one kiosk 120 is out of the promotional items, it may notify a user of another kiosk 120 that still has inventory, and may direct the user to that next kiosk 120. In these instances, a kiosk 120 may alert the next kiosk 120 that a user will be approaching the next kiosk 120.

Moreover, while display portion 213 is shown as a single continuous panel to the left (in the perspective of one facing the kiosk 120) of storage portion 214, in other arrangements, display portion 213 may comprise a plurality of panels or may be positioned above, below, or to the right (in the perspective of one facing the kiosk 120) of storage portion 214. In some examples, the display portion 213 may be removed to make an opening sized to permit an accessibility chair to be positioned near the kiosk 120. Motorized base 210 may further include a top surface 217 with interactive elements, such as NFC reader 218 and QR code 219 disposed thereon.

In the example shown in FIGS. 2A and 2B, an upper portion 220 atop motorized base 210 may include support struts 221 to connect motorized base 210 to upper shelf 222. Upper shelf 222 may include further interactive elements, such as NFC reader 223 and QR code 224 disposed thereon. Integrated display devices 124 may be mounted above upper shelf 222 and may include respective linkages 226 to move the integrated display devices 124 toward and away from the kiosk 120 for the convenience of a user. For example, a shorter user may tilt an interactive display device 124 downward using linkage 226, while a taller user may tilt an interactive display device 124 upward. In some examples, the linkages 226 may be motorized. The kiosk 120 may generally be sized to be convenient for an average adult user, while versions of kiosk 120 may be sized to accommodate children. In the exemplary embodiment shown in FIGS. 2A and 2B, there may be four integrated display devices 124 arranged around kiosk 120. In other embodiments, more or less integrated display devices 124 may be included. Struts 227 may further connect to a topmost set of display devices 228. Topmost display devices 228 may be backlit, with light sources behind the displays that may be activated based on, for example, user detection module 122 or content personalization engine 123. In some examples, display devices 228 may also signal when an associated space of the kiosk was available for visibility from a distance. For example, a green lit display could indicate an available slot at a kiosk, while red indicates the slot is taken. In other examples, all display devices 228 on a kiosk may signal that the kiosk 120 is available if even one slot is available at the kiosk, while a red light indicates that no slots are available. Signals other than green and red lights may also be employed for this purpose.

As shown in FIG. 2B, for example, the topmost set of display devices 228 may include a flat panel, such that collectively, the four depicted display devices 228 form a square or rectangle shape mirroring or otherwise aligning with the four sides of the kiosk 120. In other arrangements, however, the four depicted display devices 228 may be curved so as to form a circular shape. In such an arrangements, the four display devices 228 may optionally be replaced with a singular circular-shaped display device 228 without departing from the scope of this disclosure.

Integrated display devices 124 and display devices 228 may include all of the features and functionalities of the integrated display devices 124 described with respect to FIG. 1. Similarly, the interactive elements 218, 219, 223, and 224 in FIGS. 2A and 2B may include all features and functionalities of the interactive elements described with respect to FIG. 1. In the example shown in FIGS. 2A and 2B, each of the four sides of kiosk 120 are the same. That is, a user approaching and interacting with a first side of kiosk 120 may have the same experience as a user approaching and interacting with a second side, different than the first side, of kiosk 120.

Figure 3:
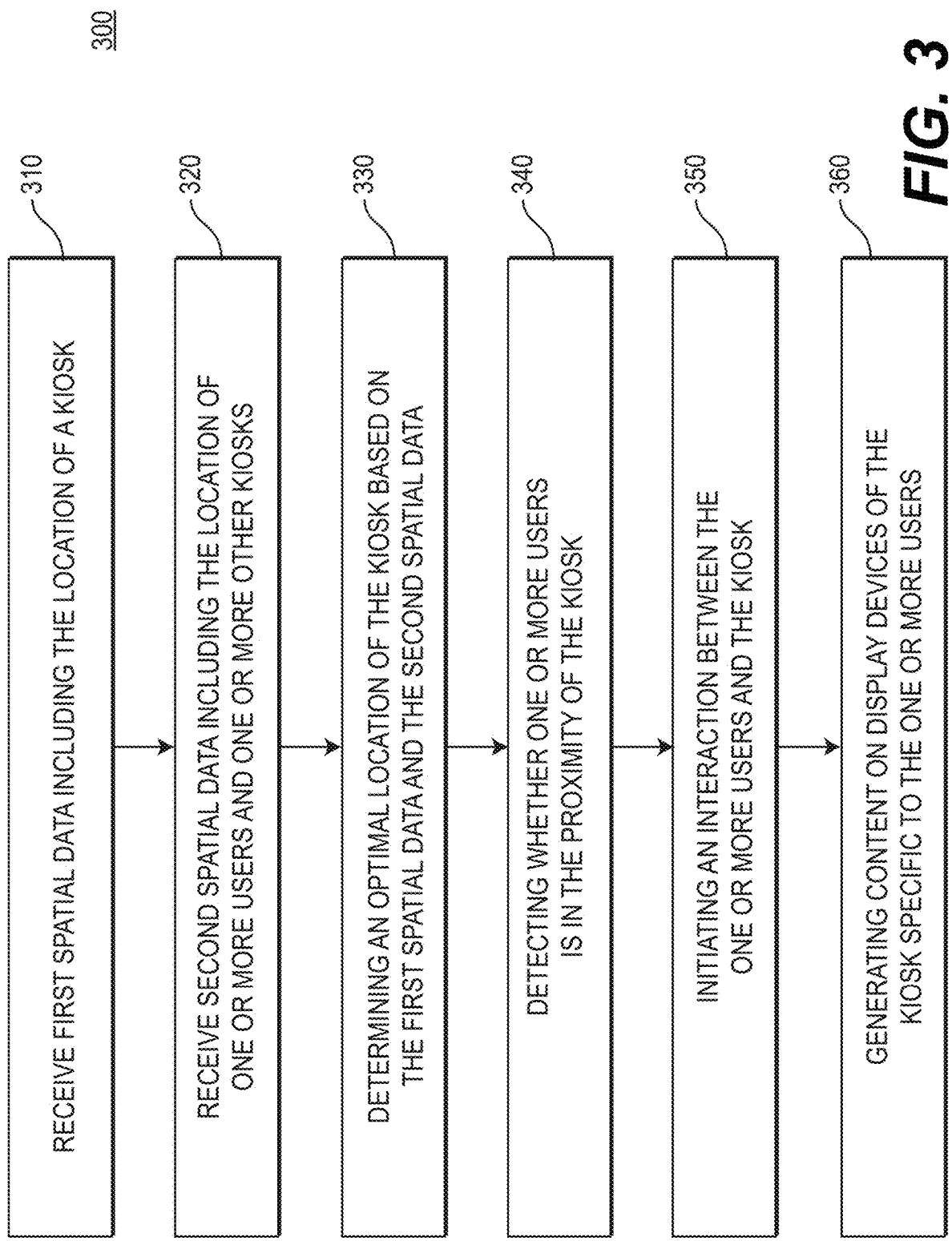
FIG. 3 depicts a flowchart of an exemplary process for facilitating user interaction with an interactive display device, according to some embodiments of the disclosure.

FIG. 3 illustrates an exemplary process 300 for facilitating user interaction with an interactive display device, according to some embodiments of the disclosure.

At step 310, the process includes receiving first spatial data including the location of a kiosk. The first spatial data may be received from sensors on-board or remove from the kiosk as described with reference to FIG. 1 above, such as a camera sensor, GPS receiver, proximity sensors, or one or more short-range wireless sensors disposed on the kiosk. The first spatial data may be received by computer system 129 in kiosk 120, or by a module within kiosk 120, such as spatial location module 121.

At step 320, the process 300 includes receiving second spatial data including a location of one or more users and one or more other kiosks. The kiosks may be interconnected, and optionally, interdependent. For example, the spatial positioning of one kiosk may be dependent on the spatial positioning of the one or more other kiosks within a space, defined by particular parameters by a provider. For example, a space may be defined by a single room within a building, a collection of rooms, an entire building, where the bounds are the walls of the rooms or building, or may be defined by a subset of a room or building with the bounds provided to the spatial location module, or may be an outdoor space with bounds similarly provided to the spatial location module. The location of each of the one or more kiosks may further be dependent on the location of one or more users. The second spatial data may be received from a variety of sensors, including camera sensors, proximity sensors, gas sensors, microphones, global positioning system (GPS) receivers, or one or more short-range wireless devices that may be disposed on the one or more kiosks and provided within a space to aid in the spatial mapping of a space for each of the kiosks. The one or more users may be identified by one or more camera sensors, proximity sensors, gas sensors, microphones, or one or more short-range wireless devices associated with each of the kiosks, and data received by sensors on one kiosk may be transmitted to the one or more other kiosks via a network, such as network 140 described with respect to FIG. 1. In some aspects, spatial location module may make the determination that a kiosk is not in an optimal position, and can generate a command to a motor 211 to navigate the kiosk to an optimal position.

At step 330, the process 300 may include determining, using a first machine learning system, an optimal location of the kiosk based on the location of the kiosk and the location of one or more users. The optimal location may also be determined based on the location of one or more other kiosks. As described above, first trained machine learning model 1210 may be stored in a kiosk within a spatial location module, or may be stored in a trained model bank stored in a remote server, such as trained model store 1340 stored within database 134 in the cloud 130 as described with respect to FIG. 1. As described above, the model may be trained on input data including locations of kiosks and users, and data relating to optimal kiosk positioning based on locations of other kiosks and users. For example, the model may direct the kiosks to navigate to locations in which users may be congregating to ensure interaction, or the model may direct the kiosks to navigate to locations in which there are less than expected numbers of users, such that the kiosk may attract users to those locations within the space.

At step 340, process 300 further includes detecting, using a second machine learning system, whether at least one user is within a pre-determined distance of the kiosk. The pre-determined distance may be tuned via second machine learning system, such as trained machine learning model 1220 described with reference to FIG. 1. Inputs to the second trained machine learning model 1220 may include data received from one or more sensors disposed with or external to the smart kiosk, such as camera sensors, proximity sensors, or the like. The user detection module may also receive inputs from short-range wireless sensors, such as Bluetooth® low energy sensors or the like, that provide information regarding the approach and proximity of user devices that receive and emit short-range wireless signals, such as smart phones, tablets, and other personal devices.

In some examples, a process may begin at step 340, such as where a kiosk is stationary or where a kiosk has already been positioned in an optimal position. Detecting whether a user is within a pre-determined distance of the kiosk may include obtaining user feedback data may be based on motion, movement, or relocation of a user device (e.g., the user device 112) towards or into a geographic location, such as a geographic location of the kiosk. For example, a user device 112 may broadcast, transmit, detect, or indicate that it has moved into a geographic location of a kiosk 120 (e.g., either internally or via the network 140), which may serve to indicate the user is approaching the kiosk 120. In some embodiments, a computer system (e.g., cloud 130) remote from the kiosk 120 may receive such an indication, transmission, or broadcast from a user device. In some embodiments, a computer system local to the kiosk 120 (e.g., computer system 129) may receive such an indication, transmission, or broadcast from a user device.

At step 350, process 300 includes, upon determining that at least one user is within a pre-determined distance of the kiosk, initiating an interaction between the kiosk and the at least one user. Initiating an interaction may include, for example, powering up a kiosk, activating integrated display devices and interfaces to prepare for an interaction with a user, generating a prompt on a display or interface inviting a user to interact with the kiosk, e.g., a prompt such as "Hello! Please tap your badge to learn more about this event," etc.

In some examples, process 300 may continue to step 360, which includes generating content on display devices of the kiosk specific to the one or more users. After a user is identified at step 350, the content personalization engine may dynamically personalize the content displayed to the user based on their profile, preferences, and interaction history, which may be provided by the user 110 or be stored in and accessed from databases 134 in the cloud 130. The content personalization engine may provide real time updates to the content displayed on kiosk 120. The content provided by content personalization engine may be specific to a user and a provider of the kiosk or an event associated with the kiosk.

Content personalization engine 123 may be configured to determine content specific to an identified user to be displayed on the one or more integrated display devices 124. The user may be identified as part of a class (e.g., conference attendee, hotel guest, event participant, VIP event partici-pant, etc.) or specifically as an individual (e.g., via user information on user device 112 or user ID 114, the user may be personally identified). The content personalization engine 123 may then generate content specific to the class the user belongs to, or specific to the particular user. As discussed above, the content to be displayed may be informational, may include interactive links and activities, and may include purchasing options for the user, in some examples. Content personalization engine 123 may receive information related to one or more users from, for example, NFC readers 125, QR code readers 126, or other sources, such as RFID readers. Users 110 may provide their user IDs 114 via interactive elements, such as tapping a badge with an NFC tag against NFC reader 125. In some examples, a QR code scanner may integrate a camera-based QR code scanning system using a computer system 129 to decodes a scannable QR code to direct the user, via user device 112, to a mobile browser to relevant content hosted on the kiosk's local server when the user device 112 or smart badge user ID 114 has a scannable QR code.

After the content personalization engine 123 has determined the identity of the user, it may have further access to more user information based on a user profile maintained, for example, by the provider of the kiosk 120. In some examples, the provider of the kiosk 120 may be a financial institution, and the user ID 114 may be a transaction card associated with the financial institution or the user device 112 may include a mobile application of the financial institution, and the mobile application may communicate to the kiosk the identity of the user 110. Upon authenticating the user, the kiosk 120 may then have access to the user's transaction and financial information, e.g., financial information, income information, transaction history, credit rating data, demographic data, purchasing behavior, purchasing history, etc. The user's transaction and financial information may be used as an input to the content personalization engine to determine content that would be useful or engaging to the particular user.

Content personalization engine 123 may further use cameras to perform an emotive detection process to gauge whether a user is satisfied with an interaction.

Kiosk 120 may include one or more output devices, such as a display and/or audio speakers, to present content to a user 110. Kiosk 120 may further include one or more of the aforementioned sensors and input devices, such as a camera or microphone, to detect a characteristic of image data of the user 110 during usage of and interaction with kiosk 120 and its content. The camera and microphone may be used to record image and/or video data of the user 110, and a microphone configured to record audio data of the user 110. The camera may record the image portion of video data. Data recorded by the sensors, such as the image and/or video data, may serve as the basis for user feedback data that is generated by kiosk 120 and transmitted to servers 132 on the cloud 130 over network 140. The servers 132 may then utilize this information to determine the reaction of user 110 to content on the kiosk to further train a content personalization model 1230.

In some examples, a network of kiosks 120 may be deployed to provide items for sale. For example, one or more kiosks 120 may be provided with items available for purchase stored in storage portion 214. The integrated display devices 124 may include a display of options of items for purchase similar to a point-of-sale device. The user may make a selection of an item to purchase and initiate a transaction by using user device 112 or user ID 114 in conjunction with one of NFC reader, RFID reader or other interactive elements. This may include any modality of providing transaction information, such as via a physical transaction card, or via a virtual card, e.g., stored in a virtual wallet on user device 112, through a mobile application stored on memory of user device 112, or via an NFC or RFID chip on user ID 114. Storage portion 214 may be locked in a closed position and unlocked upon an authorization of a transaction.

The storage portion 214 may also include items that are tagged with scannable codes. These items may be, for example, promotional items such as clothing, books, pamphlets, giveaways, or food items. A user 110 may scan the code on the item to purchase an item if the item is for sale, and the kiosk 120 may provide content to complete the transaction (operating as a point of sale device). If one kiosk 120 is out of the promotional items, it may notify a user of another kiosk 120 that still has inventory, and may direct the user to that next kiosk 120. In these instances, a kiosk 120 may alert the next kiosk 120 that a user will be approaching the next kiosk 120.

One or more implementations disclosed herein include or are implemented using a machine learning model, such as the first trained machine learning model 1210, the second trained machine learning model 1220, and the third trained machine learning model 1230. For example, one or more of the modules are implemented using a machine learning model or are used to train the machine learning model.

Figure 4:
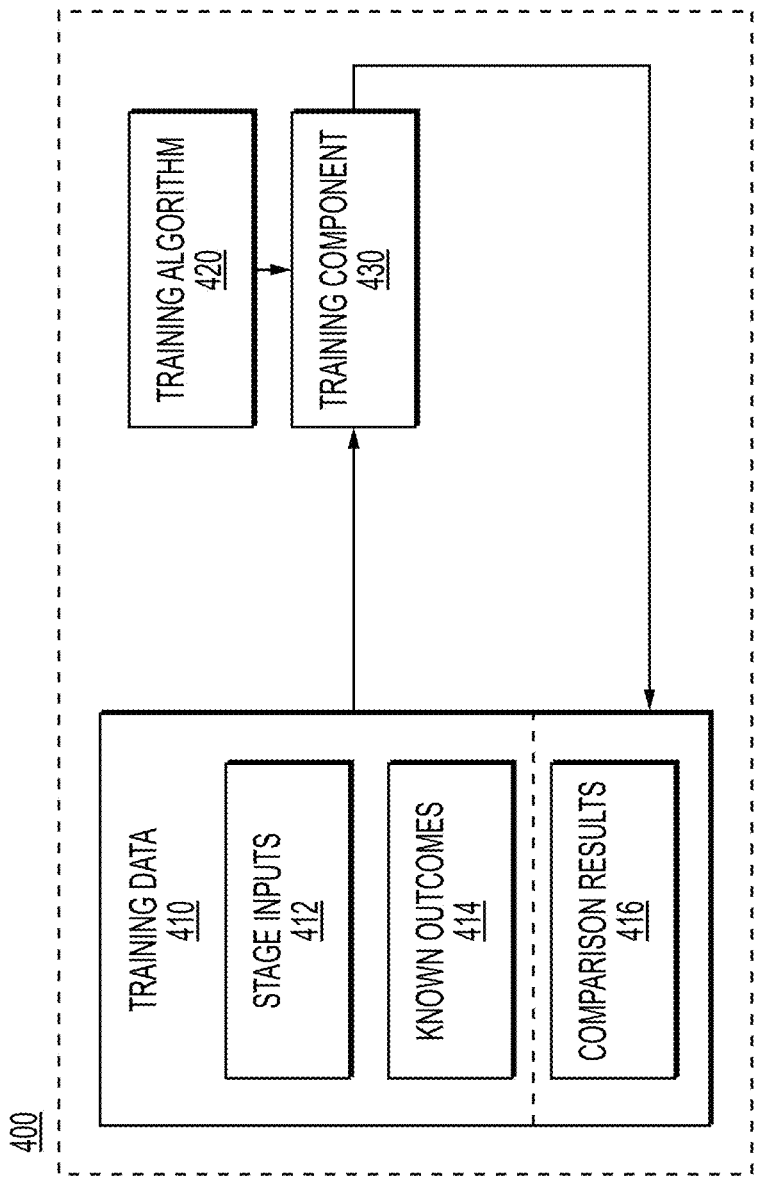
FIG. 4 shows an exemplary machine learning training flow chart, according to some embodiments of the disclosure.

FIG. 4 shows an example machine learning training flow chart 400, according to some embodiments of the disclosure. Referring to FIG. 4, a given machine learning model is trained using the training flow chart 400. The training data 410 includes one or more of stage inputs 412 and the known outcomes 414 related to the machine learning model to be trained. The stage inputs 412 are from any applicable source, including text, visual representations, data, values, comparisons, and stage outputs, e.g., one or more outputs from one or more steps from FIG. 3. The known outcomes 414 are included for the machine learning models generated based on supervised or semi-supervised training or can be based on known labels, such as review classification labels. An unsupervised machine learning model is not trained using the known outcomes 414. The known outcomes 414 include known or desired outputs for future inputs similar to or in the same category as the stage inputs 412 that do not have corresponding known outputs.

The training data 410 and a training algorithm 420, e.g., one or more of the modules implemented using the machine learning model or used to train the machine learning model, are provided to a training component 430 that applies the training data 410 to the training algorithm 420 to generate the machine learning model. According to an implementation, the training component 430 is provided with comparison results 416 that compare a previous output of the corresponding machine learning model to apply the previous result to re-train the machine learning model. The comparison results 416 are used by the training component 430 to update the corresponding machine learning model. The training algorithm 420 utilizes machine learning networks or models including, but not limited to, deep learning networks such as Deep Neural Networks (DNN), Convolutional Neural Networks (CNN), Fully Convolutional Networks (FCN), and Recurrent Neural Networks (RCN), probabilistic models such as Bayesian Networks and Graphical Models, classifiers such as K-Nearest Neighbors, or discriminative models such as Decision Forests and maximum margin methods, the model specifically discussed herein, or the like.

The spatial location module 121 may include a first machine learning model (e.g., spatial model 1210) trained to determine the current location of the kiosk 12 based on training data received from one or more on-board and remote sensors, and trained to output a destination location of the kiosk 120 based on data including engagement rate of users 110 in relation to number of kiosks 120 in a vicinity of the users, types of content available to the users, etc. The first machine learning model 1210 may be trained to determine the current location of the kiosk 120 based on first data received from first one or more on-board or remote sensors. The one or more on-board or remote sensors may include, by way of example only, camera sensors, proximity sensors, gas sensors, microphones, global positioning system (GPS) receivers, or the like.

The first data received from the first one or more on-board or remote sensors may be provided to train the first machine learning model 1210 of the spatial location module 121 trained to output one or more of a current location of the kiosk 120, a current location of one or more other kiosks 120, current locations of one or more users 110 within a space, or predicted locations of the one or more other kiosks 120 and one or more users 110. As described in further detail herein, the kiosk 120 may include a motorized base such that it may be navigated (e.g., guided, steered, driven) to a location determined by the spatial location module.

The user detection module 122 may include a second machine learning model (e.g., user detection model 1220) trained to determine when one or more users are approaching the kiosk 120. Training inputs to the second machine learning model 1220 may include second data received from second one or more on-board or remote sensors. In some arrangements, the second sensors may be the same as or similar in type to the first sensors. The second machine learning model 1220 may further be trained on inputs from short-range wireless sensors, such as Bluetooth™ low energy sensors or the like, that provide information regarding the approach and proximity of user devices that receive and emit short-range wireless signals, for example, utilizing 2.4 Gigahertz (GHz) radio frequencies (e.g., a Bluetooth™ signal or a Bluetooth LE™ signal), such as smart phones, tablets, and other personal devices.

The content personalization engine 123 may include a third machine learning model 1230 trained to determine user-specific content to be displayed on one or more display devices of the kiosk 120 based on training inputs from the user detection module 122, from third one or more sensors, such as camera sensors, proximity sensors, gas sensors, microphones, global positioning system (GPS) receivers, or the like and from one or more users 110. In some arrangements, the third sensors may be the same as or similar in type to the first sensors and the second sensors. The third machine learning model 1230 may further be trained to determine when to provide a user 110 a prompt inviting the user to provide identification data. This may include receiving training data from a user device 112 of the user that causes the user device to display the prompt, or displaying the prompt on an integrated display device 124 on the smart kiosk 120, the integrated display device 124 including a feedback component to receive feedback from the user. For example, the integrated display device 124 may be a computer console including input/output devices such as a microphone, camera, mouse, and keyboard, or a touchscreen display that may further include any further input/output devices. The content personalization engine 123 includes a trained machine learning model 1230 that receives as inputs, for example, information related to the one or more users received from the third one or more sensors or the user detection module and one or more inputs by the one or more users. In turn, the third machine learning model is trained to output content to be displayed to the one or more users.

The machine learning models used herein are trained or used by adjusting one or more weights or one or more layers of the machine learning model. For example, during training, a given weight is adjusted (e.g., increased, decreased, removed) based on training data or input data. Similarly, a layer is updated, added, or removed based on training data or input data. The resulting outputs are adjusted based on the adjusted weights or layers.

The initial training of the machine learning models may be completed by utilizing data that has been tagged. In some embodiments, this tagged data serves as an input for supervised or semi-supervised learning approaches. The tagging process can be done manually or automatically, depending on the desired level of accuracy and available resources.

Manual tagging involves human annotators who examine training data and assign appropriate classification labels based on the content and context of the training data. This method can yield high-quality labeled data, as humans can understand nuances and contextual information better than automated algorithms. However, manual tagging can be time-consuming and labor-intensive, especially when dealing with large datasets.

Automatic tagging, on the other hand, involves using algorithms, such as natural language processing techniques or pre-trained machine learning models, to assign classification labels to reviews. This approach is faster and more scalable than manual tagging but may not be as accurate, particularly when dealing with complex or ambiguous items. To improve the accuracy of automatic tagging, it can be combined with manual tagging in a semi-supervised learning approach, where a smaller set of manually tagged data is used to guide the automatic tagging process.

The data collection process can be done manually or using web-scraping techniques. Manual data collection can be time-consuming and may not cover all the available data sources. Web-scraping techniques, on the other hand, use automated tools and scripts to extract data from various sources, making the process faster and more comprehensive.

Once data has been collected and tagged with appropriate classification labels, it can be used as input for the machine learning model's training process. The model will learn to recognize patterns and features in the data that correspond to specific contexts for data. With sufficient training and accurate labeled data, the machine learning model can become adept at identifying context-specific outputs, enabling an efficient and effective model.

As one skilled in the art will appreciate in light of this disclosure, certain embodiments may be capable of achieving certain advantages, including some or all of the following: (1) improving the functionality of a computing system through a more streamlined communication interface for interacting with a display device; (2) improving the user experience in interacting with a computer system by providing the streamlined communication interface receiving dynamic and interactive information; and (3) improving the reliability of information in a database by using machine learning techniques to personalize a user experience.

It should be understood that embodiments in this disclosure are exemplary only, and that other embodiments may include various combinations of features from other embodiments, as well as additional or fewer features.

In general, any process or operation discussed in this disclosure that is understood to be computer-implementable, such as the processes illustrated in FIG. 3, may be performed by one or more processors of a computer system, such any of the systems or devices in the environment 100 of FIG. 1, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices in FIG. 1. One or more processors of a computer system may be included in a single computing device or distributed among a plurality of computing devices to perform a computer-implemented method. A memory of the computer system may include the respective memory of each computing device of the plurality of computing devices.

FIG. 5 is a simplified functional block diagram of a computer 500 that may be configured as a device for executing the methods of FIGS. 1-4, according to exemplary embodiments of the present disclosure. For example, the computer 500 may be configured as the computer system 129 or another system according to exemplary embodiments of this disclosure. In various embodiments, any of the systems herein may be a computer 500 including, for example, a data communication interface 128 for packet data communication. The computer 500 also may include a central processing unit ("CPU") 502, in the form of one or more processors, for executing program instructions. The computer 500 may include an internal communication bus 508, and a storage unit 506 (such as ROM, HDD, SDD, etc.) that may store data on a computer readable medium 522, although the computer 500 may receive programming and data via network communications (e.g., via network 140). The computer 500 may also have a memory 504 (such as RAM) storing instructions 524 for executing techniques presented herein, although the instructions 524 may be stored temporarily or permanently within other modules of computer 500 (e.g., processor 502 or computer readable medium 522). The computer 500 also may include input and output ports 512 or a display 510 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "items" or "articles of manufacture" typically in the form of executable code or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to transmitting data, it should be appreciated that the disclosed embodiments may be applicable to any environment, such as a desktop or laptop computer, an automobile entertainment system, a home entertainment system, etc. Also, the disclosed embodiments may be applicable to any type of Internet protocol.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A system, comprising:
   a base portion and an upper portion atop the base portion;
   one or more integrated display devices;
   one or more interactive elements disposed on at least one of the base portion or the upper portion; and
   a spatial location module configured to:
      receive first spatial data including a location of the system;
      receive, from one or more short-range wireless devices, second spatial data including a location of one or more users;
      determine an optimal location of the system based on the location of the system and the location of the one or more users;
      direct the system to navigate to the determined optimal location;
      detect whether at least one user among the one or more users is within a pre-determined distance of the system; and
      upon determining that at least one user is within a pre-determined distance of the system, initiate an interaction between the system and the at least one user.

2. The system of claim 1, further comprising a user detection module configured to detect a user of the one or more users approaching the system, wherein the user detection module comprises:
   at least one of a camera sensor, a proximity sensor, a gas sensor, or a global positioning receiver; and
   a first trained machine learning model.

3. The system of claim 1, wherein the spatial location module comprises:
   one or more of a camera sensor, or a short-range wireless sensor; and
   a second trained machine learning model.

4. The system of claim 1, further comprising a content personalization engine configured to determine content to be displayed on the one or more integrated display devices, wherein the content personalization engine comprises a third trained machine learning model.

5. The system of claim 1, wherein initiating the interaction between the system and the at least one user includes displaying a prompt on at least one of the one or more integrated display devices of the system, the prompt instructing the at least one user to provide first user information.

6. The system of claim 1, wherein the interaction between the system and the at least one user includes receiving first user information from the at least one user.

7. The system of claim 6, wherein the spatial location module is further configured to:
   generate, based on the first user information received from the at least one user, content on the one or more integrated display devices.

8. The system of claim 1, wherein the one or more interactive elements includes one or more of a near field communication (NFC) reader, a radio frequency identification (RFID) reader, or a scannable optical image marker.

9. A method for facilitating user interaction with a kiosk, the method comprising:
   receiving, from a kiosk, first spatial data including a location of the kiosk;

receiving, from one or more short-range wireless devices, second spatial data including a location of one or more other kiosks and one or more users;

determining, using a first machine learning system, an optimal location of the kiosk based on the location of the kiosk and the location of the one or more users;

detecting, using a second machine learning system, whether at least one user among the one or more users is within a pre-determined distance of the kiosk; and upon determining that at least one user is within a pre-determined distance of the kiosk, initiating an interaction between the kiosk and the at least one user.

10. The method of claim 9, wherein the kiosk includes a short-range wireless device and a camera, and the first spatial data includes data received from the short-range wireless device and the camera.

11. The method of claim 9, wherein determining an optimal location of the kiosk comprises determining, based on the first machine learning system, a location where one or more users are likely to be.

12. The method of claim 9, wherein the kiosk includes a motion detection sensor and a camera, and the second spatial data includes data received from the motion detection sensor and the camera.

13. The method of claim 9, wherein initiating the interaction between the kiosk and the at least one user includes displaying a prompt on a display of the kiosk, the prompt instructing the at least one user to provide first user information.

14. The method of claim 9, wherein the interaction between the kiosk and the at least one user includes receiving first user information from the at least one user.

15. The method of claim 14, wherein the first user information is received via a near field communication (NFC) reader, a radio frequency identification (RFID) reader, an optical image reader, or an integrated display device.

16. The method of claim 14, further comprising:

generating, using a third machine learning system, user-specific content on one or more displays based on the first user information.

17. A method for facilitating user interaction with a kiosk, the method comprising:

receiving, from sensors positioned on a kiosk, first spatial data including a location of the kiosk;

receiving, from one or more short-range wireless devices, second spatial data including the location of the kiosk and a location of one or more users;

determining an optimal location of the kiosk based on the location of the kiosk and the location of the one or more users;

navigating the kiosk to the determined optimal location;

detecting whether at least one user among the one or more users is within a pre-determined distance of the kiosk; and upon determining that at least one user is within a pre-determined distance of the kiosk, initiating an interaction between the kiosk and the at least one user.

18. The method of claim 17, wherein the interaction between the kiosk and the at least one user includes receiving first user information from the at least one user.

19. The method of claim 18, wherein the first user information is received via a near field communication (NFC) reader, a radio frequency identification (RFID) reader, an optical image reader, or an integrated display device.

* * * * *